(12) United States Patent
Yang et al.

(10) Patent No.: US 12,333,348 B2
(45) Date of Patent: *Jun. 17, 2025

(54) ALLOCATING COMPUTING RESOURCES FOR DEFERRABLE VIRTUAL MACHINES

(71) Applicant: Microsoft Technology Licensing, LLC, Redmond, WA (US)

(72) Inventors: Yuwen Yang, Bellevue, WA (US); Gurpreet Virdi, Redmond, WA (US); Bo Qiao, Beijing (CN); Hang Dong, Beijing (CN); Karthikeyan Subramanian, Redmond, WA (US); Marko Lalic, Seattle, WA (US); Shandan Zhou, Kenmore, WA (US); Si Qin, Beijing (CN); Thomas Moscibroda, Bellevue, WA (US); Yunus Mohammed, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/631,903

(22) Filed: Apr. 10, 2024

(65) Prior Publication Data
US 2024/0256362 A1 Aug. 1, 2024

Related U.S. Application Data

(63) Continuation of application No. 17/229,551, filed on Apr. 13, 2021, now Pat. No. 11,972,301.

(51) Int. Cl.
G06F 9/50 (2006.01)
G06F 9/455 (2018.01)

(52) U.S. Cl.
CPC ........ *G06F 9/5077* (2013.01); *G06F 9/45558* (2013.01); *G06F 9/50* (2013.01); *G06F 9/5038* (2013.01); *G06F 9/505* (2013.01); *G06F 2009/4557* (2013.01);
(Continued)

(58) Field of Classification Search
None
See application file for complete search history.

(56) References Cited

U.S. PATENT DOCUMENTS

| 9,710,830 | B1 * | 7/2017 | Vermeulen | G06Q 30/0283 |
| 2010/0161805 | A1 * | 6/2010 | Yoshizawa | G06F 9/5077 718/1 |
| 2021/0318745 | A1 * | 10/2021 | Manousakis | G06F 9/45558 |

* cited by examiner

*Primary Examiner* — Qing Yuan Wu
(74) *Attorney, Agent, or Firm* — Ray Quinney & Nebeker; James Bullough

(57) ABSTRACT

The present disclosure relates to systems, methods, and computer readable media for predicting surplus capacity on a set of server nodes and determining a quantity of deferrable virtual machines (VMs) that may be scheduled over an upcoming period of time. This determination of VM quantity may be determined while minimizing risks associated with allocation failures on the set of server nodes. This disclosure described systems that facilitate features and functionality related to improving utilization of surplus resource capacity on a plurality of server nodes by implementing VMs having some flexibility in timing of deployment while also avoiding significant risk caused as a result of over-allocated storage and computing resources. In one or more embodiments, the quantity of deferrable VMs is determined and scheduled in accordance with rules of a scheduling policy.

20 Claims, 6 Drawing Sheets

(52) U.S. Cl.
CPC .............. *G06F 2009/45583* (2013.01); *G06F 2009/45595* (2013.01); *G06F 9/5022* (2013.01); *G06F 2209/5019* (2013.01)

ALLOCATING COMPUTING RESOURCES FOR DEFERRABLE VIRTUAL MACHINES

CROSS REFERENCE TO RELATED APPLICATIONS

This application is a Continuation of U.S. application Ser. No. 17/229,551, filed on Apr. 13, 2021, the entirety of which is incorporated herein by reference.

BACKGROUND

A cloud computing system refers to a collection of computing devices capable of providing remote services and resources. For example, modern cloud computing infrastructures often include a collection of physical server devices organized in a hierarchical structure including computing zones, virtual local area networks (VLANs), racks, fault domains, etc. For instance, many cloud computing services are partitioned into clusters of nodes (e.g., node clusters). Cloud computing systems often make use of different types of virtual services (e.g., computing containers, virtual machines) that provide remote storage and computing functionality to various clients or customers. These virtual services can be hosted by server nodes on a cloud computing system.

As cloud computing continues to grow in popularity, managing different types of services and providing adequate cloud-based resources to customers has become increasingly difficult. For example, because demand for cloud computing resources is not always known in advance, conventional cloud computing systems generally plan for variable capacity demands by hosting computing resources that exceed an expected resource capacity. In this way, cloud computing systems can provide cloud computing resources during peak periods of customer demand. Indeed, many cloud computing systems accommodate variable demand by simply providing an excess of cloud computing resources beyond a peak level of expected capacity.

Providing excessive capacity to accommodate peak demand, however, increases costs associated with providing and hosting cloud computing services. These measures for accommodating peak periods of customer demand further exacerbate provider costs during periods of relatively low demand in which significant quantities of server devices are left unused for no reason other than customer demand is temporarily low. This unused capacity is expensive to power and unused devices generally depreciated in value over time. Moreover, this unused capacity represents a lost opportunity for cloud computing providers that may otherwise use this cloud computing capacity to meet the demand of a wide variety of customers having different cloud computing needs.

These and other difficulties exist in connection with providing sufficient supply of cloud computing resources.

DETAILED DESCRIPTION

Figure 1:
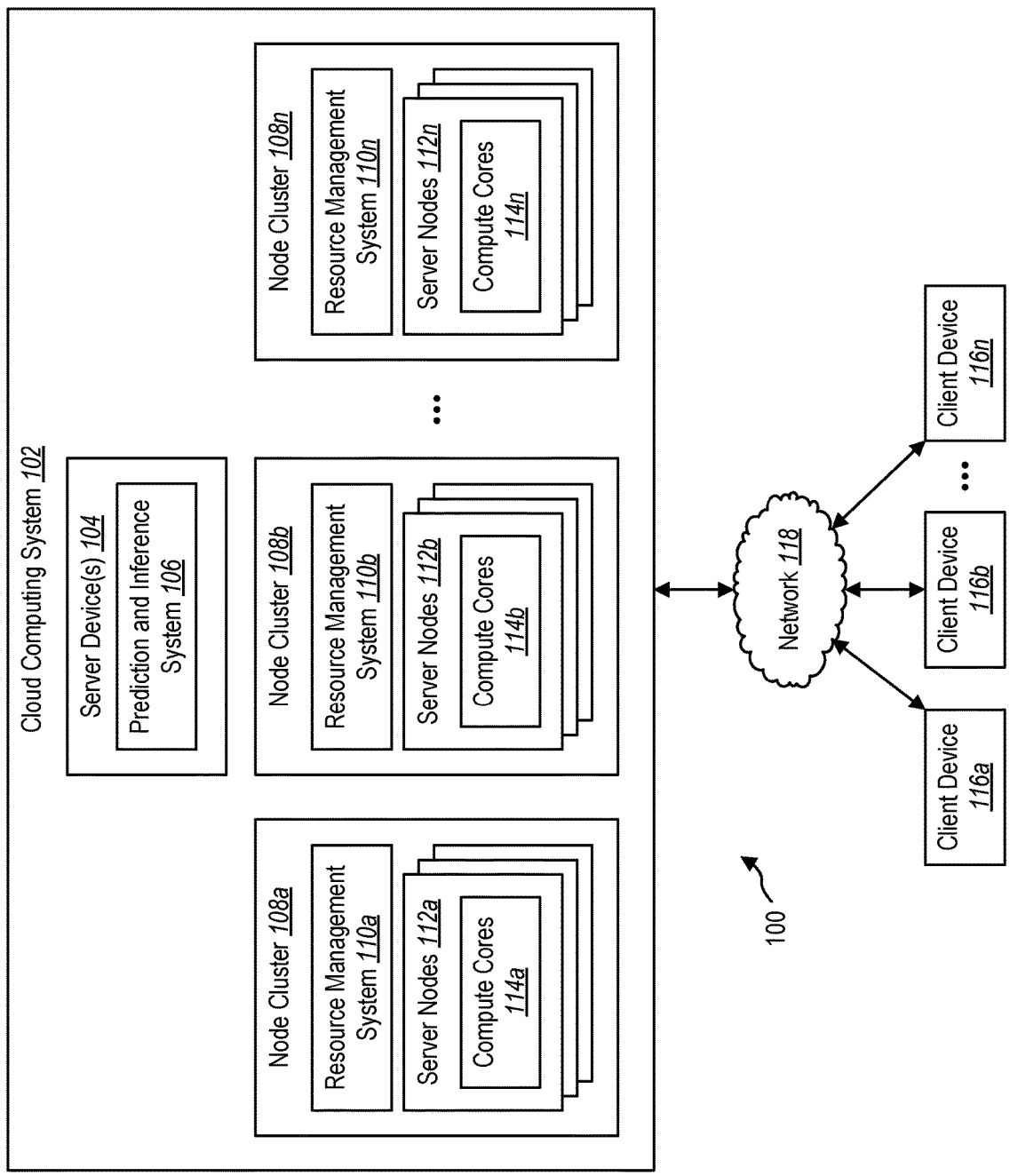
FIG. 1 illustrates an example environment of a cloud computing system including systems for implementing deferrable virtual machines on server nodes of the cloud computing system.

The present disclosure is generally related to predicting capacity on a set of server nodes (e.g., a node cluster) of a cloud computing system and determining a quantity of deferrable virtual machines (VMs) that may be scheduled over a period of time (e.g., an upcoming period of time) without also causing VM requests for other types of VMs and other services from failing. In particular, this disclosure describes systems that facilitate features and functionality related to improving utilization of surplus resource capacity on a plurality of server nodes by implementing VMs having some flexibility in timing of deployment while also avoiding significant risk caused as a result of over-allocated storage and computing resources.

As an illustrative example, and as will be discussed in further detail below, systems described herein may determine predicted capacity information for a plurality of server nodes that includes an indication of surplus capacity for an identified period of time (e.g., an upcoming period of time) on the plurality of server nodes. The system(s) may further determine a quantity of computing resources on the server nodes to indicate as eligible for deployment of deferrable VMs based on the indication of surplus capacity. The system(s) may additionally receive deployment requests for the deferrable VMs including indicated ranges of time for initiating the deferrable VMs during which, once initiated, the deferrable VMs can run uninterrupted on a computing resource. The system(s) may also generate and implement allocation instructions for allocation of computing resources for deployment of deferrable VMs thereon over the identified period of time.

The present disclosure includes a number of practical applications that provide benefits and/or solve problems associated with efficiently utilizing computing resources on a cloud computing system while providing sufficient resources for periods of peak capacity demand. Some non-limiting examples of these applications and benefits are discussed in further detail below.

As noted above, systems described herein involve implementing deferrable VMs on a cloud computing system to provide flexible scheduling of VMs and other services on a set of server nodes (e.g., a node cluster). As will be discussed in further detail below, these deferrable VMs provide a measure of flexibility related to a timing that the VMs can be scheduled. This scheduling may be performed in a way that surplus capacity is utilized during periods in which the set of server nodes have sufficient capacity to deploy VMs for some period of time. As will be discussed below, these deferrable VMs can be scheduled in such a way as to avoid interrupting or otherwise terminating operation of the deferrable VMs during an identified period of time associated with the surplus capacity.

For example, the systems described herein include features and functionality to accurately predict upcoming capacity over time based on historical capacity observed over a previous period of time. In particular, the systems described herein utilize one or more prediction models (e.g., machine learning models) trained to determine periodic trends of capacity for a set of server nodes on a daily and/or weekly basis. This prediction enables the system to infer capacity for an upcoming period of time in a way that can be used to determine how many deferrable VMs can be deployed over the upcoming period of time without causing an increase in allocation failures for other types of VMs (e.g., on-demand or otherwise non-deferrable VMs).

In addition to accurately predict utilization patterns, the systems described herein can implement a scheduling policy including rules that minimize risk associated with unexpected resource requests. For example, a scheduling policy may include rules for timing allocation of computing resources within a period of capacity surplus in a way that minimizes risk of allocation failures. The scheduling policy may further include rules associated with different types and sizes of deferrable VMs that can be scheduled within an identified period of time. The scheduling policy may additionally include features for dynamically modifying a quantity of deferrable VMs that should be deployed based on observed changes to resource capacity over time.

Optimizing utilization of resource capacity on a set of server nodes in accordance with embodiments described herein can further provide significant cost benefits associated with providing various cloud computing services. For example, by utilizing a greater quantity of resources as a result of enabling deployment of deferrable VMs, the systems described herein create additional sources of revenue for customers of the cloud computing system. This can additionally be performed while managing risk of allocation failure within an acceptable threshold, thus preventing negative experiences for customers of the cloud computing system. Moreover, the systems can additionally prevent scenarios in which hardware of the cloud computing system goes unused for extended periods of time causing depreciation in value of the unused hardware.

As illustrated in the foregoing discussion, the present disclosure utilizes a variety of terms to describe features and advantages of the systems described herein. Additional detail is now provided regarding the meaning of some example terms.

For example, as used herein, a "cloud computing system" refers to a network of connected computing devices that provide various services to customer devices (e.g., client devices, network devices). For instance, as mentioned above, a distributed computing system can include a collection of physical server devices (e.g., server nodes) organized in a hierarchical structure including clusters, computing zones, virtual local area networks (VLANs), racks, fault domains, etc. In addition, it will be understood that while one or more specific examples and implementations described herein relate specifically to "clusters" or "node clusters" of server nodes, features and functionality described in connection with one or more node clusters can similarly relate to racks, regions of nodes, datacenters, or other hierarchical structures in which network devices are grouped together. The cloud computing system may refer to a private or public cloud computing system.

As used herein, a "virtual machine" or "VM" refers to an emulation of a computer system on a server node that provides functionality of one or more applications on the cloud computing system. Virtual machines can provide functionality needed to execute one or more operating systems. In addition, virtual machines can make use of hypervisors on processors of server devices that support virtual replication of hardware. It will be understood that while one or more specific examples and implementations described herein relate specifically to virtual machines, features and functionality described in connection with scheduling and implementing virtual machines on server nodes may similarly apply to other types of cloud-computing services (e.g., computing containers).

One or more embodiments described herein relate specifically to scheduling and implementing deferrable virtual machines (VMs) on server nodes of a cloud computing system. As used herein, a "deferrable VM" refers to a type of VM having many similarities as on-demand or other non-deferrable VMs, but that have a degree of flexibility associated with when the deferrable VM can be run. For example, as will be discussed in further detail below, a request to deploy a deferrable VM may include an indicated range of time that the deferrable VM may be deployed on the cloud computing system. Moreover, the deployment request may include an indicated time duration that the deferrable VM needs to run uninterrupted on the server node(s). Of note, once a deferrable VM is initiated, it transitions to a similar state or a similar priority-level as an on-demand or other non-deferrable VM that runs until completion. In particular, after a deferrable VM has been initiated, deployment and allocation policies would not cause the deferrable VM to be evicted to accommodate other customer requests or other VM demands based on its status as a deferrable VM. This is notably different from low priority or other evictable VMs that can be interrupted or evicted to accommodate incoming requests for on-demand or other non-deferrable VMs.

As used herein, "utilization data" may refer to any information associated with allocation, deployment, or utilization of resources on a cloud computing system. For example, utilization data may refer to states of utilization on a node cluster captured at different points in time (e.g., a snapshot of resource utilization). Examples of utilization data may include a number of nodes and/or node cores on a node cluster having virtual machines or other services thereon, a metric of fragmentation or shape of resource utilization such as a number of empty nodes and/or percentage of node cores in use by virtual machines, and observed trends of utilization over time (e.g., cross-day utilization, intra-day utilization). Utilization data may further include data associated with properties or characteristics of hardware and/or services (e.g., virtual machines) on a node cluster. Utilization data may refer to raw data and/or refined or extrapolated data that provides a description of resource utilization on a node cluster for a set of customer deployments.

Cluster features or feature signals may refer to different types of characteristics or categories of features such as snapshot log data or a utilization log including signals associated with utilization on a node cluster. By way of example, and as will be discussed in further detail below, feature signals may refer to counts of available VMs for a given region, utilization of cores for a given nod cluster, metrics of fragmentation for a node cluster or other grouping of server nodes based on ratios of available compute cores and a total number of compute cores. As a further example, feature signals may refer to property log signals (e.g., characteristics associated with hardware types and/or VM types) and any other characteristics of a set of server nodes that may be used to determine a projected capacity of cloud-computing resources over an identified period of time (e.g., an upcoming period of time). Indeed, as will be discussed in further detail below, feature signals may refer to any signal that can be provided as an input to a prediction model in accordance with one or more embodiments described herein.

As used herein, a "deployment," "customer deployment," or "tenant deployment" may refer interchangeably to one or more associated services and allocations provided by a cloud computing system via a node cluster. For example, a deployment may refer to one or multiple services and/or applications provided to or otherwise accessible to a customer (or multiple associated customers) using computing resources of a node cluster. A deployment may refer to one or multiple services provided based on an initial deployment request. In one or more embodiments described herein, a deployment refers exclusively to related services and allocations within a single node cluster.

As used herein, a "core," "compute core," or "node core" may refer interchangeably to a computing resource or unit of computing resources provided via a computing node (e.g., a server node) of a cloud computing system. A compute core may refer to a virtual core that makes use of the same processor without interfering with other virtual cores operating in conjunction with the processor. Alternatively, a compute core may refer to a physical core having a physical separation from other compute cores. Compute cores implemented on one or across multiple server nodes may refer to a variety of different cores having different sizes and capabilities. A server node may include one or multiple compute cores implemented thereon. Furthermore, a set of multiple cores may be allocated for hosting one or multiple virtual machines or other cloud-based services.

Additional detail will now be provided regarding systems described herein in relation to illustrative figures portraying example implementations. For example, FIG. 1 illustrates an example environment 100 including a cloud computing system 102. The cloud computing system 102 may include any number of devices. For example, as shown in FIG. 1, the cloud computing system 102 may include one or more server device(s) 104 having a prediction and inference system 106 implemented thereon. As will be discussed in further detail below, the prediction and inference system 106 may provide features and functionality related to collecting historical utilization data, training prediction models to estimate surplus capacity over a period of time, and provide information associated with the estimated surplus capacity to systems on respective node clusters.

In addition to the server device(s) 104, the cloud computing system 102 may include any number of node clusters 108*a-n*. One or more of the node clusters 108*a-n* may be grouped by geographic location (e.g., a region of node clusters). In one or more embodiments, the node clusters 108*a-n* are implemented across multiple geographic locations (e.g., at different datacenters including one or multiple node clusters). Each of the node clusters 108*a-n* may include a variety of server nodes having a number and variety of compute cores. In addition, one or more virtual machines or other cloud computing resources and services may be implemented on the compute cores of the server nodes.

Each of the node clusters 108*a-n* may have resource management systems implemented thereon to perform features and functionalities described herein in connection with scheduling and implementing deferrable VMs on server nodes of the cloud computing system 102. For example, as shown in FIG. 1, a first node cluster 108*a* may include a resource management system 110*a* tasked with managing resources of the first node cluster 108*a*. In particular, as will be discussed in further detail below, the resource management system 110*a* may include one or more components configured to receive information from the prediction and inference system 106 and allocate computing resources on a set of server nodes 112*a* in accordance with rules of one or more policies (e.g., scheduling policies). Each of the additional node clusters 108*b-n* may have resource management systems 110*b-n* thereon that enforce similar or different policies in accordance with one or more embodiments described herein.

As further shown in FIG. 1, the first node cluster 108*a* may include a first set of server nodes 112*a*. Each node from the first set of server nodes 112*a* may include one or more compute core(s) 114*a*. One or more of the compute cores 114*a* may include virtual machines and/or other cloud computing services implemented thereon. In one or more embodiments, the first node cluster 108*a* may include allocated resources for a variety of virtual machines including a combination of deferrable and non-deferrable VMs. The server node(s) 112*a* may include any number and variety of compute cores 114*a*. Moreover, the server node(s) 112*a* may host a number and a variety of virtual machines and other services. As shown in FIG. 1, the cloud computing system 102 may include multiple node clusters 108*a-n*. Each of the node clusters 108*a-n* may include a resource management system 110*a-n*, server nodes 112*a-n*, and compute cores 114*a-n*.

As shown in FIG. 1, the environment 100 may include a plurality of client devices 116*a-n* in communication with the cloud computing system 102 (e.g., in communication with different server nodes 112*a-n* via a network 118). The client devices 116*a-n* may refer to various types of computing devices including, by way of example, mobile devices, desktop computers, server devices, or other types of computing devices. The network 118 may include one or multiple networks that use one or more communication platforms or technologies for transmitting data. For example, the network 118 may include the Internet or other data link that enables transport of electronic data between respective client devices 116*a-n* and devices of the cloud computing system 102.

As mentioned above, and as will be discussed in further detail below in connection with FIGS. 2-4, the prediction and inference system 106 may perform features related to collecting utilization data and estimating capacity (e.g., surplus capacity) on node clusters 108*a-n* of the cloud computing system 102. For example, the prediction and inference system 106 can collect historical utilization data and identify trends of utilization over time. In one or more embodiments, the prediction and inference system 106 predicts upcoming capacity based on the historical utilization data and identified trends.

As will be discussed in further detail below, the prediction and inference system 106 can determine predictions of utilization and resource capacity using one or more prediction models. For example, in one or more embodiments, the prediction and inference system 106 incorporates functionality of multiple prediction models. In one or more embodiments described herein, the prediction and inference system 106 implements a combined prediction model that combines outputs from a daily prediction model and a weekly prediction model. As used herein, a "daily prediction model" or "daily model" may refer to a prediction model based on daily seasonality and/or trends. Similarly, a "weekly prediction model" or "weekly model" may refer to a prediction model based on weekly seasonality and/or trends. Similarly, as will be discussed in further detail below, a combined model may refer to a combination of multiple prediction models, such as a prediction model based on daily and weekly seasonality. One or more of these models may refer to machine learning models, such as neural networks, or other deep-learning models. Additional information in connection with the prediction model(s) will be discussed below in connection with FIG. 3.

In addition to predicting utilization and capacity generally, in one or more embodiments, the prediction and inference system 106 can predict a surplus capacity of computing resources associated with an identified period of time. For example, as will be discussed below in connection with one or more examples, the prediction and inference system 106 can consider predictions of utilization while observing current data to determine an estimated quantity of resources that can be safely allocated for deployment of deferrable VMs. More specifically, in one or more embodiments, the prediction and inference system 106 can determine a quantity of computing resources that, if allocated, would maintain less than a threshold measure of risk that incoming VM requests (e.g., non-deferrable VM requests) will not be met with allocation failures (e.g., based on lack of availability of computing resources).

As mentioned above, each of the resource management systems 110a-n may utilize information received from the prediction and inference system 106 to make individual determinations of allocation and scheduling in accordance with rules of a policy (e.g., a scheduling policy). For example, the resource management systems 110a-n may include components that manage receipt of VM requests (e.g., deferrable and/or non-deferrable VM requests) based on a combination of information received from the prediction and inference system 106 and policy rules. In one or more embodiments, the resource management systems 110a-n intelligently schedule the VM requests (e.g., deferrable VM requests) based on the information received from the prediction and inference system 106 and based on the policy rules.

In one or more embodiments, the systems 106, 110a-n are implemented as part of a more comprehensive system of central and distributed resource management on the cloud computing system 102. For example, in one or more embodiments, the prediction and inference system 106 may refer to a subsystem of a central resource system that generates and provides other information such as policies regarding new allocations, predictions of allocation failures, general capacity and utilization predictions, VM migration impact metrics, or any other information related to management of computing resources on the cloud computing system 102. Accordingly, while one or more embodiments described herein relate specifically to a prediction and inference system 106 that determines surplus capacity predictions and facilitates scheduling deployments of deferrable VMs for node clusters 108a-n on a cloud computing system 102, it will be appreciated that one or more systems and modules may similarly communicate information to the resource management systems 110a-n for use in allocating computing resources for deferrable VMs in addition to any other features and functionalities related to allocating computing resources for any cloud-computing services on the cloud computing system 102.

Figure 2:
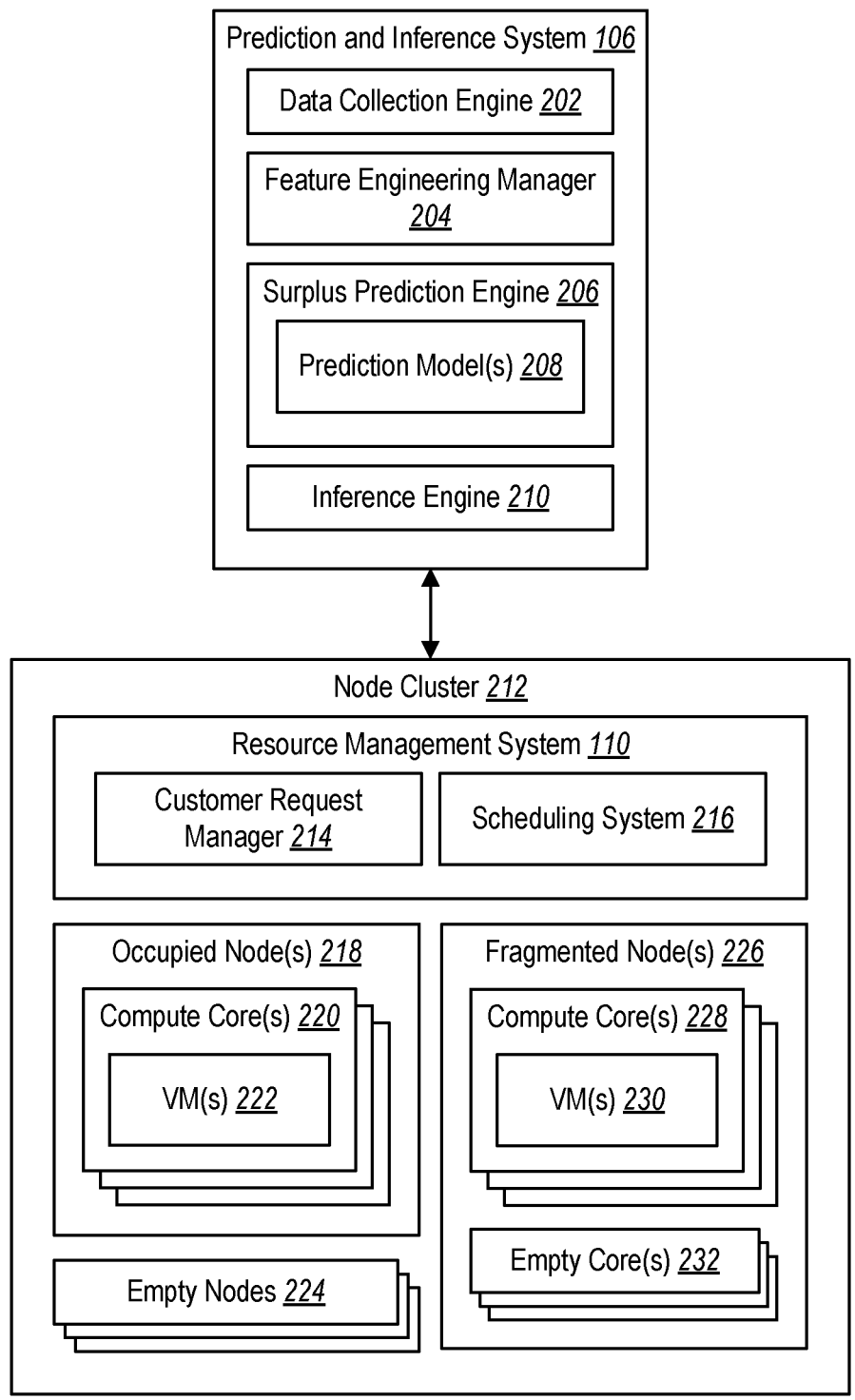
FIG. 2 illustrates an example implementation of a prediction and inference system and a resource management system on a node cluster in accordance with one or more embodiments.

FIG. 2 illustrates an example implementation in which the prediction and inference system 106 determines an estimated surplus capacity for a period of time (e.g., an upcoming period of time over the next day and/or week) and where a resource management system 110 allocates computing resources during the period of time based on the estimated surplus capacity. In particular, FIG. 2 illustrates an example implementation in which the prediction and inference system 106 interacts with a resource management system 110 implemented on an example node cluster 212. The node cluster 212 and the associated resource management system 110 may include similar features and functionality as any of the node clusters 108a-n and resource management systems 110a-n discussed above in connection with FIG. 1. Indeed, the node cluster 212 may refer to an example of one of the node clusters 108a-n within the cloud computing system 102 from FIG. 1. Moreover, it will be appreciated that while FIG. 2 illustrates an example including a node cluster 212, features described in connection with one or more embodiments herein may similarly apply to any grouping of server nodes capable of hosting deferrable VMs thereon.

As shown in FIG. 2, the prediction and inference system 106 includes a data collection engine 202, a feature engineering manager 204, a prediction engine 206, and an inference engine 210. As further shown, the prediction engine 206 may include one or more prediction models 208 thereon trained to predict resource capacity on the node cluster 212. Each of the components 202-210 may cooperatively determine a prediction of resource utilization on the node cluster 212 and generate one or more inferences and other information associated with an estimated surplus capacity on the node cluster 212 over an upcoming period of time.

As further shown, the resource management system 110 may include a customer request manager 214 and a scheduling system 216. Each of these components 214-216 may cooperatively process incoming resource requests for incoming VMs. In particular, these components 214-216 can process requests and selectively schedule VM requests for a combination of deferrable and non-deferrable VMs to be hosted on the node cluster 212. More specifically, and as will be discussed in further detail below, the components of the resource management system 110 can facilitate allocating resources for incoming requests for deferrable VMs based on time ranges received in connection with the deferrable VM requests in addition to an indication of surplus capacity received from the prediction and inference system 106. Additional features and functionality of the resource management system 110 will be discussed below (e.g., in connection with FIG. 4).

As further shown, the node cluster 212 may include any number and variety of server nodes. For example, the node cluster 212 may include occupied nodes 218 in which compute cores 220 have virtual machines 222 or other services implemented thereon. In particular, the occupied nodes 218 may refer to fully occupied nodes in which all compute cores 220 are occupied by one or more virtual machines 222 hosted on the server nodes. The node cluster 212 may also include empty nodes 224 having no virtual machines deployed thereon. Because the empty nodes 224 have no virtual machines deployed thereon, the empty nodes 224 may be used by the resource management system 110 for a variety of applications. For instance, the empty nodes 224 may be used as a target destination for any virtual machine on the node cluster 212. Moreover, the empty nodes 224 may be used to perform repairs, updates, or any other operation on the node cluster 212 where occupied or fragmented nodes may be incompatible or unavailable.

As further shown, the node cluster 212 may include a number of fragmented nodes 226. In particular, as shown in FIG. 2, the fragmented nodes 226 may include occupied compute cores 228 having virtual machines 230 deployed thereon. In one or more embodiments, a virtual machine may be deployed on multiple compute cores. The fragmented nodes 226 may additionally include empty cores 232 having no virtual machines deployed thereon. Where a fragmented node includes a number of empty cores capable of hosting a virtual machine, the virtual machine may be deployed to the empty core(s). However, where a fragmented node includes fewer empty cores than is needed to host a virtual machine, the virtual machine would need to be deployed to a different node, such as an empty node or another fragmented node having enough empty cores. As will be discussed in further detail below, the prediction and inference system 106 may determine an estimated surplus capacity based at least in part on fragmentation characteristics of server nodes on the node cluster 212. Indeed, as will be discussed in further detail below, predicted surplus capacity information may include not only an indication of total surplus capacity, but may include characteristics of fragmentation for the surplus capacity that may be considered in scheduling deferrable VMs of different types.

Each of the components of the prediction and inference system 106 and resource management system 110 may be in communication with each other using any suitable communication technologies. In addition, while components of the systems 106, 110 are shown to be separate in FIG. 2, any of the components or subcomponents may be combined into fewer components, such as into a single component, or divided into more components as may serve a particular implementation. As an illustrative example, the data collection engine 202 and/or feature engineering manager 204 may be implemented on different server devices of a cloud computing system 102 as the surplus prediction engine 206 and/or inference engine 210.

In addition, the components of the systems 106, 110 may include hardware, software, or both. For example, the components of the systems 106, 110 may include one or more instructions stored on a computer-readable storage medium and executable by processors of one or more computing devices. When executed by the one or more processors, the computer-executable instructions of one or more computing devices (e.g., server device(s) 104, server nodes) can perform one or more methods described herein. Alternatively, the components of the systems 106, 110 may include hardware, such as a special purpose processing device to perform a certain function or group of functions. Additionally, or alternatively, the components of the systems 106, 110 may include a combination of computer-executable instructions and hardware.

An example implementation of the prediction and inference system 106 and resource management system 110 will now be discussed in connection with example frameworks illustrated in FIGS. 3-4. In particular, FIG. 3 illustrates an example framework showing an example implementation of the prediction and inference system 106 in determining an indication of surplus capacity and other associated information based on prediction models trained to determine an estimated capacity surplus for a set of server nodes. Moreover, FIG. 4 illustrates an example framework showing an example implementation in which the resource management system facilitates deployment of deferrable VMs based on information received from the prediction and inference system 106 and in view of a scheduling policy associated with a set of server nodes.

Figure 3:
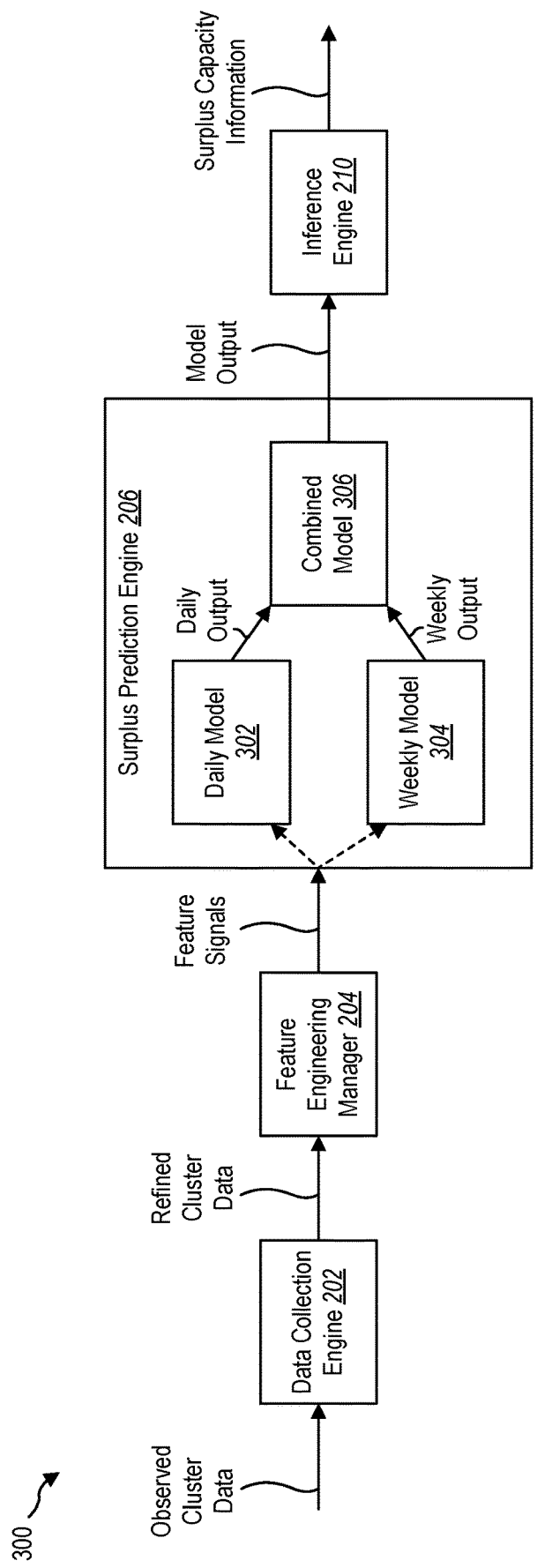
FIG. 3 illustrates an example framework for determining surplus capacity for an upcoming period of time for server nodes of a cloud computing system in accordance with one or more embodiments.

As stated above, FIG. 3 illustrates an example framework 300 showing components of the prediction and inference system 106 in accordance with one or more embodiments and which may include similar features and functionality as other examples discussed herein. As shown in FIG. 3, the prediction and inference system 106 may make use of a prediction engine 206 including a plurality of prediction models thereon. For example, the prediction engine 206 may include a daily model 302, weekly model 304, and combined model 306, which will be discussed in further detail below. These models 302-306 may refer to examples of the prediction model(s) 208 discussed above in FIG. 2.

As shown in FIG. 3, a data collection engine 202 may receive observed cluster data including any information associated with utilization of resources as well as properties and characteristics of devices and services of a node cluster. While the data collection engine 202 may receive observed cluster data from any number of node clusters, for ease in explanation, the example shown in FIG. 3 will be discussed in connection with receiving observed cluster data for a single node cluster. Nevertheless, features described herein in connection with collecting data and using said data to predict surplus capacity for a given node cluster may similarly apply to any set of server nodes on a cloud computing system.

The data collection engine 202 can collect a variety of types of utilization data. For example, the data collection engine 202 may receive a series of snapshot logs indicating states of resource utilization on the node cluster over time. For example, the data collection engine 202 may receive a snapshot log of data including various types of information such as an availability of server nodes at a corresponding point in time, a difference between a current core utilization on the node cluster and a total capacity of compute cores on the node cluster, or a ratio of available compute cores in a set of server nodes and a total number of compute cores on the set of server nodes. The snapshot log data may further include information about VMs, such as a count of available VMs for a given region (e.g., a node cluster) and/or a type of available VMs that can be deployed on a given set of server nodes.

In addition to snapshot log data indicating states of resource utilization over time, the data collection engine 202 can collect property log data including characteristics of hardware (e.g., hardware types) on the node cluster as well as virtual machine types deployed on the node cluster. For example, the data collection engine 202 can collect property log data including indicated hardware generations of the server nodes and compute cores, identifications of cluster types (e.g., associated with specific types of VMs that are supported by the cluster(s), and memory categories, such as medium memory, high memory, and low memory device types. The property log data can also include transition stock keeping unit (SKU) data, such as an indication of whether hardware is under a decommission process.

In one or more embodiments, the data collection engine 202 collects raw utilization data at points in time (e.g., at corresponding timestamps) associated with utilization of resources and/or properties of devices and services on the node cluster. For example, the data collection engine 202 may capture or otherwise obtain periodic snapshots of utilization data for the node cluster at different points in time.

In one or more embodiments, the data collection engine samples utilization information at regular or irregular intervals. In one or more implementations, the data collection engine 202 collects utilization information about a subset of nodes and/or cores rather than collecting comprehensive information about each and every core or server node of the node cluster. Thus, in one or more embodiments, the data collection engine 202 generates refined cluster data that includes a more comprehensive set of information (e.g., utilization data) for the node cluster over a previous duration of time. The data collection engine 202 may generate the refined cluster data in a variety of ways.

For example, in one or more embodiments, the data collection engine 202 performs a statistical analysis and quantity measurement of the raw cluster data to identify errors and implications of the data. In one or more embodiments, the data collection engine 202 applies an adaptive interpolation approach to fill in missing or incomplete data associated with the utilization and/or characteristics of nodes and/or virtual machines of the node cluster. This may include observing trends of a number of compute cores occupied by virtual machines and other information indicating trends of compute capacity and fragmentation characteristics of the node cluster. Indeed, the data collection engine 202 may employ a number of interpolation approaches to generate the refined cluster data.

As an illustrative example, where one or more occupied nodes and fragmented nodes have historically been occupied by the same number of virtual machines for a stable period of time and where a number of empty nodes remains relatively unchanged over time, the data collection engine 202 may extrapolate utilization data and other information based on a mean, median, or mode value of core capacity and utilization for the node of the node cluster. As another example, where historical data associated with utilization of cluster resources fluctuates in a predictable or periodic way, the data collection engine 202 can apply a one or more regression models to predict fluctuating utilization information over time. For example, where utilization statistics increase or otherwise fluctuate on weekends as a result of higher utilization by customers for certain types of virtual machines, the data collection engine 202 can apply a regression model to the historical data to extrapolate similar fluctuations on weekends or other days of the week. The data collection engine 202 may similarly apply a regression or other model over longer periods of time to identify long-term trends, such as increased utilization due to deployment expansions and/or a change in fragmentation characteristics over time.

As a further example, the data collection engine 202 can employ a more complex model to predict non-obvious utilization trends than mean, median, mode, or simple regression models. For example, the data collection engine 202 can employ a machine learning model, algorithm, or other deep learning model(s) trained to extrapolate utilization data and other information where no obvious pattern exists in the utilization of cluster resources over time. In one or more embodiments, the data collection engine 202 employs a processing model trained to extrapolate the refined cluster data by applying each of the processing models (e.g., mean, mode, mean regression, complex model) depending on the trends of portions of the raw data collected by the data collection engine 202.

As further shown in FIG. 3, the data collection engine 202 can provide refined cluster data to a feature engineering manager 204 for generating information (e.g., feature signals) that may be fed as inputs to the surplus prediction engine 206. For example, the feature engineering manager 204 can evaluate the refined cluster data and determine any number of feature signals that the surplus prediction engine 206 is trained to receive or otherwise recognizes as valid input to use in generating a failure prediction for the node cluster. These feature signals may relate to one or more types of the utilization data as well as characteristics of hardware and/or services on the node cluster.

As noted above, the surplus prediction engine 206 can receive information about historical usage on a node cluster and determine a predicted surplus capacity for an upcoming period of time. For instance, as shown in FIG. 3, the feature engineering manager 204 can provide feature signals indicative of resource usage over some previous period of time (e.g., one week, two weeks, four weeks) that the surplus prediction engine 206 is trained to receive as input and generate a model output including a prediction of surplus capacity for an upcoming period of time (e.g., one day, one week).

It will be understood that the feature signals provided as input to the surplus prediction engine 206 may refer to time-series data (e.g., including historical information over some previous period of time) in addition to a current representative of data on the node cluster. Indeed, as will be discussed in further detail below, while historical information may provide important information for use in predicting a future capacity surplus, the surplus prediction engine 206 may use this information in combination with the present information to accurately determine the model output reflective of an estimated surplus capacity for an upcoming period of time.

In one or more embodiments, the surplus prediction engine 206 consumes and provides the feature signals as inputs to a prediction model that includes multiple prediction models operating in parallel. For example, as shown in FIG. 3, the surplus prediction engine 206 may include a daily model 302 and a weekly model 304. The daily model 302 may refer to a prediction model that is trained to predict daily trends of resource utilization. In contrast, the weekly model 304 may refer to a prediction model that is trained to predict weekly trends of resource utilization. The outputs of these respective prediction models 302-304 may be provided to a combined model 306 that utilizes one or more models and/or algorithms to combine the daily output and a weekly output to determine a model output reflective of an accurate prediction of capacity surplus over a given time horizon (e.g., one day, one week, four weeks).

It will be noted that the daily model 302 and the weekly model 304 may be trained to determine daily and weekly trends using different training methods. For example, in one or more embodiments, the daily model 302 is trained using more granular data and over a shorter period of time than the weekly model 304. For instance, in one or more embodiments, the daily model 302 is trained based on observed trends (e.g., averages, changes) for one hour intervals over one week of historical data. Other implementations may include smaller or larger intervals of observed trends. In one or more embodiments, the weekly model 304 is trained based on observed trends for four to six hour intervals over four weeks of historical data. In one or more embodiments, the weekly model 304 includes smaller or larger intervals of observed trends. In one or more embodiments, the weekly model utilizes larger time intervals than the daily model to provide a smoother curve that may serve to normalize some of the daily spikes while considering weekly seasonality. Other trends and training models may be used depending on desired metrics of accuracy, availability of computational power, etc.

Because hourly and daily trends may differ from week to week and even from day to day depending on the time of day, day of the week, seasonality, and other factors, the surplus prediction engine 206 may incorporate a combined model 306 that includes model(s) and/or algorithms for combining the daily output and weekly output to improve accuracy of the model output from the respective models 302-304. This combination may be performed in a number of different ways.

As an example, the combined model 306 may implement an algorithm that discounts one or more of the daily or weekly outputs based on combinations of predictions from the respective models and observed trends. For instance, where a daily prediction value is greater than a daily prediction average, the combined model 306 may normalize a prediction of the model output based on a weekly prediction value (e.g., an average weekly prediction value). In one or more embodiments, the combined model output may further consider peaks and valleys of the individual model outputs (e.g., ratios between respective peaks and/or valleys). To illustrate, an example algorithm used by the combined model 306 may include the following for determining a prediction value ($X'_t$):

if $X_t \geq Avg_1$:

$$X'_t = Avg_2 + (X_t - Avg_1) \times \frac{Peak_2 - Avg_2}{Peak_1 - Avg_1}$$

where $X_t$ refers to a daily prediction value at timestamp (t) and where $Avg_1$ refers to a daily prediction average, $Avg_2$ refers to a weekly prediction average, $Peak_1$ refers to a daily prediction peak value, and $Peak_2$ refers to a weekly prediction peak value. Alternatively:

if $X_t \leq Avg_1$:

$$X'_t = Avg_2 + (X_t - Avg_1) \times \frac{Valley_2 - Avg_2}{Valley_1 - Avg_1}$$

where $Valley_1$ refers to a daily prediction minimum value and $Valley_2$ refers to a weekly prediction minimum value.

In addition to normalizing peaks and valleys of the daily and weekly outputs in accordance with the above-algorithms and models, in one or more embodiments, the combined model 306 further considers confidence values associated with the respective model outputs. For example, as an alternative or as an addition to the above-algorithm, in one or more embodiments, the combined model 306 discounts or even ignores a value from one of the models 302-304 where the respective outputs are associated with a confidence of below a threshold value. For example, where a daily model 302 outputs a daily output having a low measure of confidence for some reason (e.g., seasonality, weekend unpredictability), the combined model 306 may weight the daily output less heavily or simply use the weekly output when outputting the model output. Alternatively, where the weekly model 304 outputs a weekly output having a low measure of confidence, the combined model 306 may similarly weight the weekly output less heavily or simply use the daily output when generating the model output.

As mentioned above, and as further shown in FIG. 3, the model output can be provided to an inference engine 210 for generating surplus capacity information to provide as an input to a scheduling system. For example, in one or more embodiments, the inference engine 210 generates capacity signals that support decision making by the scheduling system 216. As an illustrative example, in one or more embodiments, the inference engine 210 generates a signal indicating a predicted number of cores of capacity that will be available over an upcoming period of time. This may be as simple as providing a total number of non-allocated compute cores that make up a surplus of computing capacity over a duration of time.

In one or more embodiments, the inference engine 210 generates more complex signals that provide additional surplus information. For example, in one or more embodiments, the inference engine 210 generates and provides information about fragmentation of server nodes and compatibility of the capacity surplus for various types of virtual machines. For example, the inference engine 210 may provide a signal indicating different types of surplus capacity and associated virtual machine types that may be deployed on the indicated computing capacity.

In one or more embodiments, the inference engine 210 estimates an expected available capacity for all future resource allocations by considering types of VMs selected, properties of the node cluster that supports the VM types, platform fragmentation, out-of-service rates, overheads, reservations, and other platform evolution and efficiency indicators. Moreover, in one or more embodiments, this estimation is based primarily on non-deferrable VM requests. Thus, the surplus prediction engine 206 and inference engine 210 may determine the estimated surplus capacity without considering deferrable VM deployments on the node capacity.

In one or more embodiments, the inference engine 210 provides an estimation not only of surplus computing capacity, but specifically provides information associated with surplus capacity that can be allocated for deferrable VMs. For example, the inference engine 210 may consider various factors such as threshold buffer capacity that the node cluster needs to maintain. The inference engine 210 may further consider risks associated with unpredictable patterns of VM requests that may or may not be received. Thus, in one or more embodiments described herein, the inference engine 210 determines surplus capacity information including an indication of a number of deferrable VM requests that might be scheduled over an identified period of time without causing a threshold amount of risk that non-deferrable VM request will result in allocation failures in the event that the indicated number of deferrable VM requests are received and processed.

As an illustrative example, the inference engine 210 may receive an estimated capacity including an indication of expected utilization over a period of time. The estimated capacity may include an average estimated value, upper and lower bound estimated values, and other information about a projected usage pattern. The inference engine 210 may parse the estimated capacity information and determine a more cluster-specific estimation or inferences indicating properties of an upcoming capacity valley in which surplus computing resources will be available for a duration of time. Indeed, the inference engine 210 can generate surplus capacity information including a wide variety of signals that may be used by the scheduling system 216 in scheduling allocation of deferrable VMs over an upcoming capacity valley. A number of example surplus capacity signals will now be discussed below.

In one or more embodiments, the inference engine 210 generates a number of surplus capacity prediction signals. For instance, the inference engine 210 may generate a precise timestamp signal indicating a time that the prediction and inference is ingested. Another example surplus capacity signal may include a scope signal indicating a scope of the capacity signal (e.g., a region of server nodes or specific cluster of a datacenter). Another example signal may include a count of available VMs for a given region of server nodes and VM types shared across VM sizes consuming the same hardware SKUs. Another example may include a projected expected available capacity for deferrable VMs in compute cores. Another example may include a projected usage pattern, which may include an indicator representative a relative available capacity within a given tie window. For instance, this may include a classification value of zero (0) indicating that no deferrable VMs should be scheduled during the given time window. As another example, this may include a classification value of ten (10) indicating that all deferrable VM requests should be scheduled within the given time window. This may additionally include any number of classification values ranging between zero and ten (or other scale) indicating different numbers of deferrable VMs that can be scheduled during the capacity valley. Another example may include a predicted start of an interval (e.g., a first timestamp in a list of predictions). Another example may include a predicted interval (e.g., in minutes). In one or more embodiments, the example surplus prediction signals include a predicted core utilization signal indicating a number of projected cores that will be used by non-deferrable VMs.

In one or more embodiments, the inference engine 210 generates surplus capacity information including a number of KPI and monitoring signals. By way of example and not limitation, the KPI and monitoring signals may include an indication of low confidence for prediction and inferences at large. The signals may further include a low predictability indicator for indicating whether a capacity pocket has low predictability. The signals may include various metrics about the prediction models 302-406, such as mean absolute percentage error (MAPE), average overestimate rates, average hit rates, peak overestimate rates, and peak hit rates.

Figure 4:
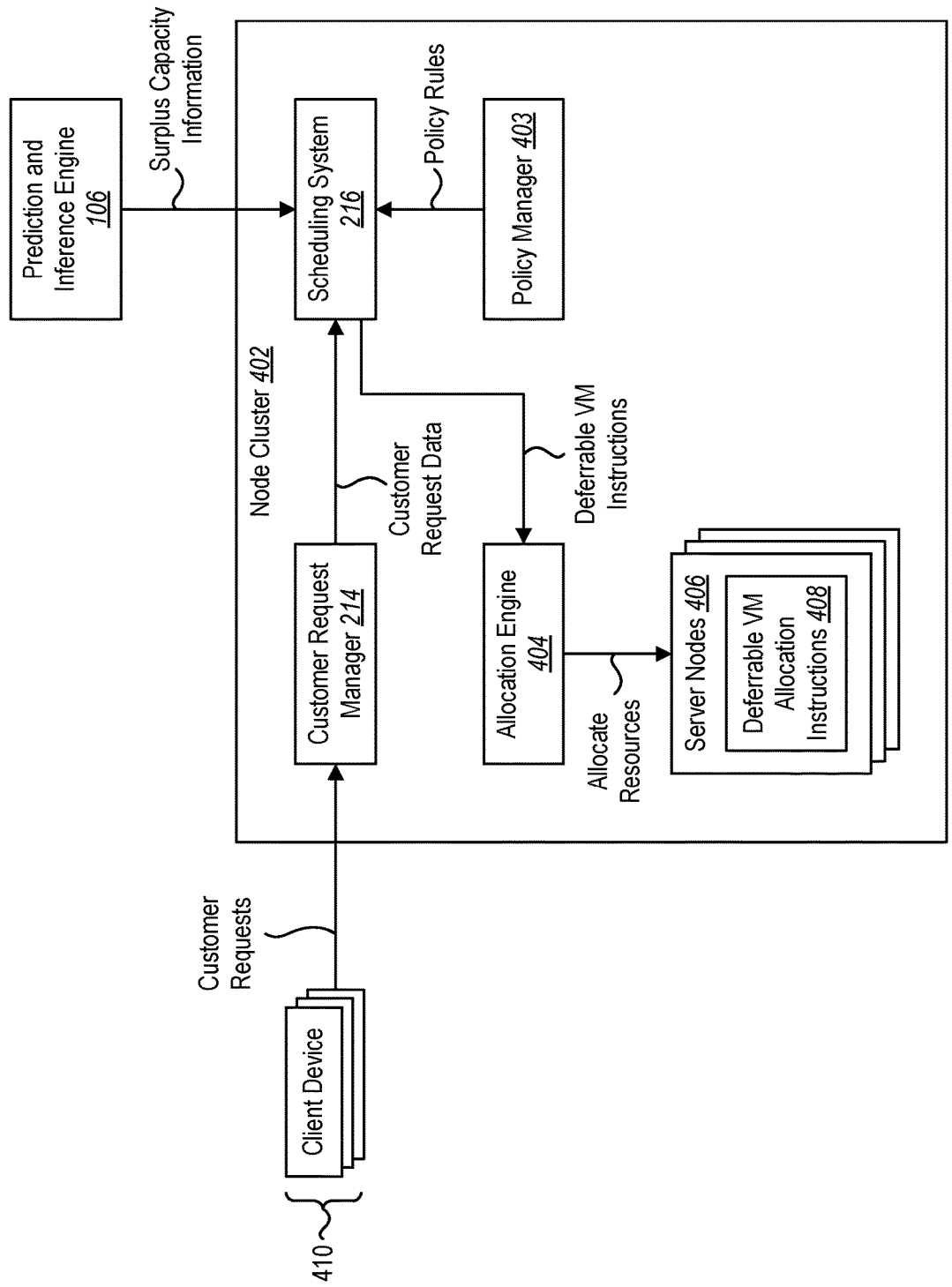
FIG. 4 illustrates an example framework for scheduling deferrable virtual machines based on a predicted surplus capacity in accordance with one or more embodiments.

Indeed, as shown in FIG. 3, and as further shown in FIG. 4, the inference engine 210 can generate and provide surplus capacity information including a wide variety of signals containing different types of information to the scheduling system 216 that may be used in scheduling deferrable VMs on a given node cluster. For example, FIG. 4 illustrates an example scheduling system 216 that receives surplus capacity information from a prediction and inference system 106 for use in scheduling allocation of computing resources for incoming customer requests for deferrable VMs.

In particular, FIG. 4 shows an example implementation in which deferrable VMs can be processed by a resource management system implemented on an example node cluster 402. More specifically, FIG. 4 illustrates an example implementation including a scheduling system 216 and customer request manager 214 that communicate with an allocation engine 404 and facilitate deployment of deferrable VMs 408 on server nodes 406 of the node cluster 402 based on surplus capacity information received from the prediction and inference system 106 and in view of policy rules maintained by a policy manager 403. It will be appreciated that the prediction and inference system 106, customer request manager 214, and scheduling system 216 may include similar features and functionality as discussed above in connection with various example implementations.

As shown in FIG. 4, a customer request manger 214 may receive customer requests from a plurality of client devices 410. The customer requests may refer to deployment requests for any number and variety of VM-types. For example, the customer requests may include a combination of deferrable and non-deferrable VM requests. While the customer request manager 214 may execute instructions for communicating customer request information that includes instructions for both deferrable and non-deferrable VMs, for ease in explanation, features and functionalities described in connection with FIG. 4 will refer primarily to handling and otherwise processing deferrable VM requests based on surplus capacity information for the node cluster 402.

As noted above, the customer requests may include a variety of information that the customer request manager 214 and scheduling system 216 may use in scheduling allocation of computing resources for one or more deferrable VMs. For instance, a customer request may include any information describing computing resource needs for a customer. By way of example, the customer request may include a number of VMs of a given type and a timespan in which the deferrable VMs should be fulfilled. The customer requests may additionally include a maximum price the customer is willing to pay, a type of the selected VM(s), and a duration of time that the VM(s) should run. Other customer request information may include schedule and lifetime indicators, an indicated start of the timespan, and end of the timespan, an SKU name (e.g., hardware type), an instance count, and SKU capacity.

Prior to or while the customer request manager 214 is receiving customer requests for deployment of deferrable VMs, the scheduling system 216 may receive surplus capacity information including a variety of surplus capacity signals as discussed above. As discussed generally, in one or more embodiments, the scheduling system 216 can determine a schedule for deployment of some number of deferrable VMs in accordance with a scheduling policy, which will be discussed in further detail below. More specifically, the scheduling system 216 can ingest the surplus capacity information and policy rules and determine lifecycle transitions of customer requests by deciding which and when deferrable VM requests should be fulfilled or terminated.

By way of example, the scheduling system 216 can facilitate processing received customer requests as they are received. For example, the customer request manager 214 may notify receipt of incoming requests by providing customer request information to the scheduling system 216 as shown in FIG. 4. The scheduling system 216 may maintain a list of currently unscheduled deferrable VM requests. The scheduling system 216 may additionally process the pending requests in a number of ways based on the surplus capacity information and various policy rules.

By way of example, in one or more embodiments, the scheduling system 216 discards one or more customer requests having validity periods that are still upcoming (e.g., that have not yet begun). In addition, the scheduling system 216 may discard any request with an indicated maximum price that is set to a value that is lower than the current price of the resources. Other customer requests may be grouped according to various criteria. For example, the deferrable VM requests may be grouped by VM-type or other VM characteristics.

For each grouping of the deferrable VMs within the list of unscheduled requests, the scheduling system 216 may obtain signals from the surplus capacity information and policy rules that provide context for the specific grouping of VM requests. In this way, the scheduling system 216 may account for unique characteristics of the different groups. For example, where a first group of customer requests refer to VMs of a smaller size than a second group, the first group of VM requests may more easily be allocated within a capacity having a higher fragmentation than a second group of VM requests having larger VM sizes. In this sense, the scheduling system 216 may schedule deployment of deferrable VMs from the first group using a more aggressive scheduling algorithm or risk threshold(s) than when deploying deferrable VMs from the second group.

As another example, where deferrable VM request durations of requests are longer than the predicted duration in which a surplus capacity is predicted, these VM requests may also be excluded from a list of eligible customer requests. As noted above, the capacity valley (i.e., the duration of the predicted surplus capacity) may be determined based on the surplus capacity information received from the prediction and inference system 106.

In addition to maintaining a list of pending requests and a list of rejected requests, the scheduling system 216 may additionally maintain a list of fulfilled customer requests for deferrable VMs. For each fulfilled request, the scheduling system 216 can track the time the requests was fulfilled and the associated request duration. The scheduling system 216 may additionally determine the expiration time for the request. In one or more embodiments, the scheduling system 216 may provide instructions to an executor to terminate all compute resources that were part of a given customer request.

As an illustrative example in line with one or more embodiments described above, the scheduling system 216 may obtain current capacity duration information. The scheduling system 216 can filter out requests where a current time is not within an indicated timespan from the customer request(s). The scheduling system 216 may also filter out requests where an indication duration is larger than a predicted capacity valley. The scheduling system 216 may further filter out requests where an indicated maximum price is less than a current price. The scheduling system 216 may further sort the requests by timestamps, VM types, etc. The scheduling system 216 may additionally generate and provide allocation instructions for the remaining customer requests based on the surplus capacity information and domain knowledge related to available VMs. For example, where an instance count for current requests is less than an indicated availability of VMs, the scheduling system 216 may add a request to a list of blocks to allocate and update a count of pending VMs. The scheduling system 216 may then move to evaluating a next customer request.

As mentioned above, the scheduling system 216 may schedule customer requests for deployment of deferrable VMs in accordance with a scheduling policy. For example, once the scheduling system 216 has determined a list of eligible customer requests to be fulfilled at a particular time, the scheduling system 216 may consider policy rules for a scheduling policy (e.g., received from a policy manager 403) to determine which requests to fulfill at a higher priority and/or at an earlier or later time.

In one or more embodiments, the scheduling system 216 further filters customer requests by assigning weights to the pending requests within the maintained record of customer requests based on various policy rules. For example, the scheduling system 216 may assign different priorities for scheduling based on customer priority, workload types, size of VMs, duration of VM lifetimes, etc. In one or more embodiments, the scheduling policy may include a rule or policy to schedule a diverse set of deferrable VM requests to avoid discarding all VMs of a particular type in favor of a smaller or easier scheduled VM-type. In one or more embodiments, the scheduling policy may include priorities to maximize a number of VMs and/or a cost of VMs. In one or more embodiments, the scheduling policy includes rules to flatten the surplus capacity more evenly over a capacity valley. In one or more embodiments, the scheduling policy includes rules for scheduling as many VM requests as early as possible within the capacity valley.

Indeed, the scheduling policy may include any number of rules that may be modified or re-prioritized based on goals and thresholds for the node cluster 402. For example, threshold risks may be modified based on unpredictability of surplus capacity information received from the prediction and inference system 106. In one or more embodiments, the scheduling policy includes rules for modifying allocation of resources based on changing present circumstances to enable the scheduling system 216 to accommodate for an abrupt change in capacity for an on-demand customer (or expansion of an existing deployment). In one or more embodiments, the scheduling system 216 implements one or more override procedures to overrule an automatic scheduling mechanism in the event that the automatic predictions and scheduling decisions re unable to account for sudden changes in trends or requirements.

As further shown in FIG. 4, the scheduling system 216 may provide deferrable VM allocation instructions to an allocation engine 404 (e.g., an executor) configured to create or otherwise allocate the compute resources to accommodate the customer requests. In one or more embodiments, the allocation engine 404 orchestrates creation of relevant resources and provides the status of provisioning back to the scheduling system 216. This enables the scheduling system 216 to track the expiration time for the customer requests and make future scheduling decisions based on an awareness of VM lifetimes and when the deferrable VMs are set to expire after completion of various computing tasks.

Figure 5:
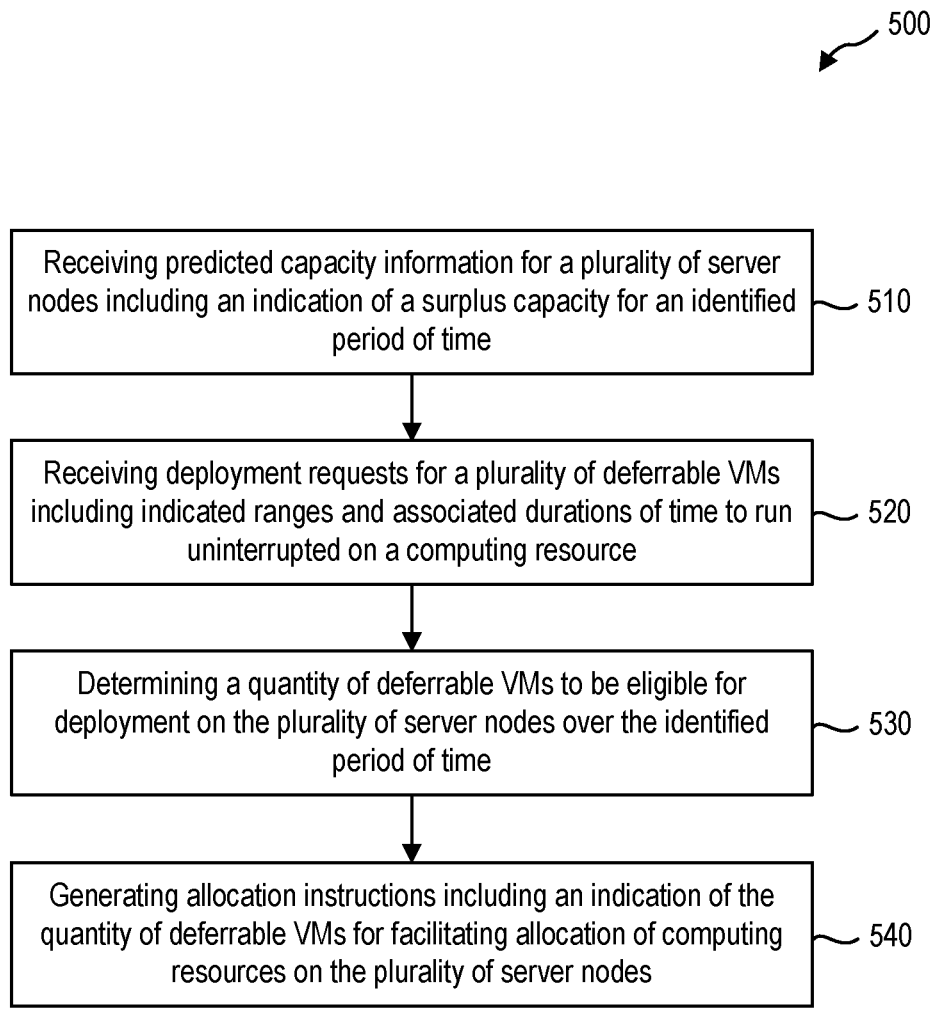
FIG. 5 illustrates an example series of acts for scheduling and allocating computing resources for deferrable virtual machines in accordance with one or more embodiments.

Turning now to FIG. 5, this figure illustrates an example flowchart including a series of acts for predicting surplus capacity for a set of server nodes and intelligently scheduling deferrable VMs based on the predicted surplus capacity. While FIG. 5 illustrates acts according to one or more embodiments, alternative embodiments may omit, add to, reorder, and/or modify any of the acts shown in FIG. 5. The acts of FIG. 5 can be performed as part of a method. Alternatively, a non-transitory computer-readable medium can include instructions that, when executed by one or more processors, cause a computing device (e.g., a server device) to perform the acts of FIG. 5. In still further embodiments, a system can perform the acts of FIG. 5.

FIG. 5 illustrates an example series of acts 500 related to predicting surplus capacity for a set of server nodes (e.g., a node cluster) and scheduling deferrable VMs based on the predicted surplus capacity. As shown in FIG. 5, the series of acts 500 includes an act 510 of receiving predicted capacity information for a plurality of server nodes including an indication of a surplus capacity for an identified period of time. For example, in one or more embodiments, the act 510 includes receiving predicted capacity information for a plurality of server nodes, the predicted capacity information including an indication of a surplus capacity for an identified period of time on the plurality of server nodes.

As further shown, the series of act 500 includes an act 520 of receiving deployment requests for a plurality of deferrable VMs including indicated ranges and associated durations of time to run uninterrupted on a computing resource. For example, in one or more embodiments, the act 520 includes receiving deployment requests for a plurality of deferrable VMs, the deployment requests including, for each deferrable VM, an indicated range of time for initiating the deferrable VM and an associated duration of time for the deferrable VM to run uninterrupted on a computing resource.

As further shown, the series of acts 500 includes an act 530 of determining a quantity of deferrable VMs to be eligible for deployment on the plurality of server nodes over the identified period of time. For example, in one or more embodiments, the act 530 includes determining a quantity of deferrable VMs from the plurality of deferrable VMs to be eligible for deployment on the plurality of server nodes over the identified period of time based on the indication of the surplus capacity for the identified period of time.

As further shown, the series of acts 500 includes an act 540 of generating allocation instructions including an indication of the quantity of deferrable VMs for facilitating allocation of computing resources on the plurality of server nodes. For example, in one or more embodiments, the act 540 includes generating allocation instructions to provide to an allocation engine configured to allocated computing resources on the plurality of server nodes, the allocation instructions including an indication of the quantity of deferrable VMs eligible for deployment over the identified period of time.

In one or more embodiments, the quantity of deferrable VMs eligible for deployment is based on a set of rules from a scheduling policy where the set of rules include one or more rules associated with managing risk of allocation failures on the plurality of server nodes with respect to allocating computing resources for non-deferrable VMs. In one or more embodiments, the set of rules includes one or more rules for prioritizing early allocation of the deferrable VMs within the identified period of time. Further, in one or more embodiments, generating the allocation instructions includes scheduling allocation of computing resources for as many deferrable VMs as possible while maintaining less than a threshold measure of risk associated with failure of incoming VM requests.

In one or more embodiments, the series of acts 500 includes grouping the received deployment requests within deployment groups based on VM characteristics of the plurality of deferrable VMs. Further, in one or more embodiments, determining the quantity of deferrable VMs includes selectively identifying a quantity of deferrable VMs from a subset of the deployment groups based on the VM characteristics for the subset of the deployment groups and in view of the predicted capacity information. In one or more embodiments, the VM characteristics includes a VM size for a corresponding VM type and the subset of the deployment groups is selected based on the VM size being smaller than VM sizes for other deployment groups.

In one or more embodiments, the predicted capacity information is determined based on a capacity prediction model trained to determine an estimated capacity of nodes cores that are available for hosting virtual machines thereon over the identified period of time. In one or more embodiments, the capacity prediction model includes a combined prediction model trained to combine a first prediction of capacity based on a daily prediction model and a second prediction capacity based on a weekly prediction model determine the estimated capacity of cores that are available for hosting virtual machines thereon over the identified period of time.

In one or more embodiments, combining the first prediction of capacity and the second prediction of capacity includes comparing confidence levels associated with the first prediction of capacity and the second prediction of capacity and discounting one of the first prediction of capacity or the second prediction of capacity if one of the first confidence level or the second confidence level is less than a threshold confidence level. Further, in one or more embodiments, the capacity prediction model includes one or more machine learning models trained to output the estimated capacity of nodes based on training data including historical utilization of compute cores on the plurality of server nodes over a previous period of time. In one or more embodiments, the capacity prediction model is further trained over time based on changes in utilization of the compute cores on the plurality of server nodes over time.

In one or more embodiments, the indication of the surplus capacity includes a metric of fragmentation associated with fragmentation of the server cores that make up the surplus capacity for the identified period of time. In one or more embodiments, determining the quantity of deferrable VMs to be eligible for deployment includes determining a first quantity associated with a first type of deferrable VM and a second quantity associated with a second type of deferrable VM, the first quantity and second quantity being based in part on the metric of fragmentation included within the indication of the surplus capacity.

In one or more embodiments, the series of acts 500 includes maintaining a record of deployment requests for the plurality of deferrable VMs where the record of deployment requests includes a record of deferrable VMs that have not been fulfilled and a record of deferrable VMs that are currently running on the plurality of server nodes. In one or more embodiments, generating the allocation instructions further includes generating eviction instructions for one or more deferrable VMs that are currently running on the plurality of server nodes based on expiration of an indicated lifetime for the one or more deferrable VMs.

Figure 6:
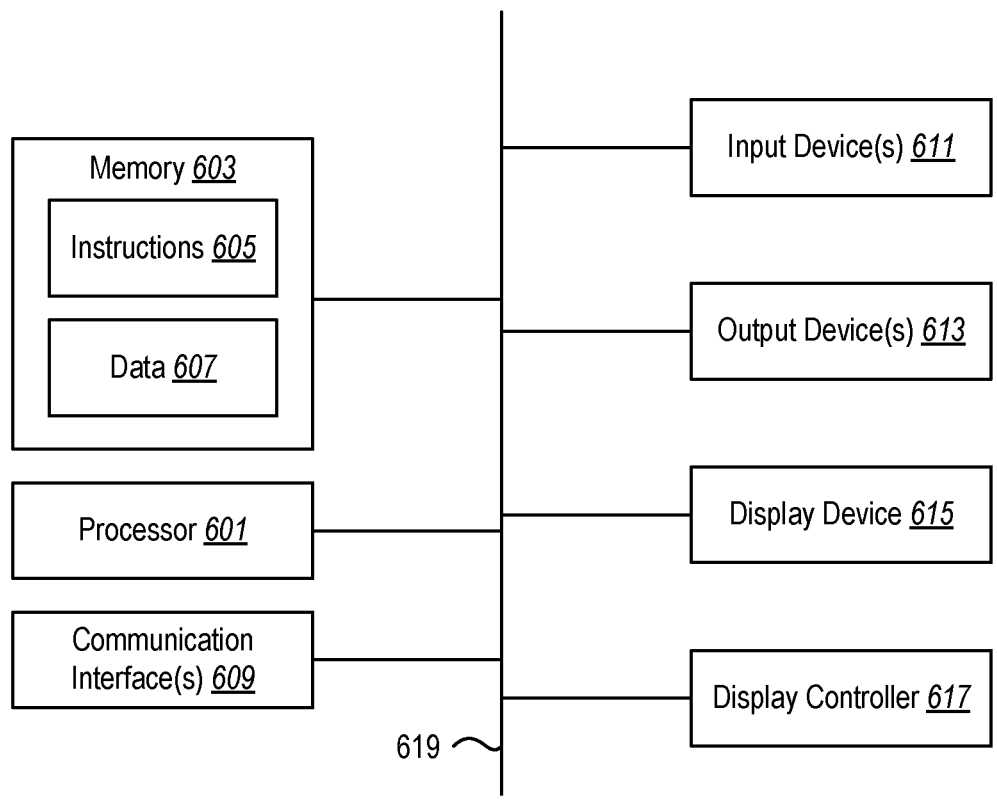
FIG. 6 illustrates certain components that may be included within a computer system.

FIG. 6 illustrates certain components that may be included within a computer system 600. One or more computer systems 600 may be used to implement the various devices, components, and systems described herein.

The computer system 600 includes a processor 601. The processor 601 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   receiving predicted capacity information for a plurality of server nodes, the predicted capacity information including an indication of a surplus capacity for an identified period of time on the plurality of server nodes;
   receiving deployment requests for a plurality of deferrable virtual machines (VMs), the deployment requests including, for each deferrable VM, an associated duration of time for the deferrable VM to run uninterrupted on a computing resource;
   determining a quantity of deferrable VMs from the plurality of deferrable VMs to be eligible for deployment on the plurality of server nodes over the identified period of time based on the indication of the surplus capacity for the identified period of time; and
   generating allocation instructions to provide to an allocation engine configured to allocate computing resources on the plurality of server nodes, the allocation instructions including instructions associated with deploying deferrable VMs over the identified period of time.

2. The method of claim 1, wherein the quantity of deferrable VMs eligible for deployment is based on a set of rules from a scheduling policy, wherein the set of rules include one or more rules associated with managing risk of allocation failures on the plurality of server nodes with respect to allocating computing resources for non-deferrable VMs.

3. The method of claim 2, wherein the set of rules includes one or more rules for prioritizing early allocation of the deferrable VMs within the identified period of time, and wherein generating the allocation instructions includes scheduling allocation of computing resources for as many deferrable VMs as possible while maintaining less than a threshold measure of risk associated with failure of incoming VM requests.

4. The method of claim 1, further comprising:
grouping the received deployment requests within deployment groups based on VM characteristics of the plurality of deferrable VMs,
wherein determining the quantity of deferrable VMs includes selectively identifying a quantity of deferrable VMs from a subset of the deployment groups based on the VM characteristics for the subset of the deployment groups and in view of the predicted capacity information.

5. The method of claim 4, wherein the VM characteristics includes a VM size for a corresponding VM type, and wherein the subset of the deployment groups is selected based on the VM size being smaller than VM sizes for other deployment groups.

6. The method of claim 1, wherein the predicted capacity information is determined based on a capacity prediction model trained to determine an estimated capacity of nodes cores that are available for hosting virtual machines thereon over the identified period of time.

7. The method of claim 6, wherein the capacity prediction model includes a combined prediction model trained to combine a first prediction of capacity based on a daily prediction model and a second prediction of capacity based on a weekly prediction model determine the estimated capacity of cores that are available for hosting virtual machines thereon over the identified period of time.

8. The method of claim 7, wherein combining the first prediction of capacity and the second prediction of capacity includes comparing a first confidence level associated with the first prediction of capacity and a second confidence level associated with the second prediction of capacity and discounting one of the first prediction of capacity or the second prediction of capacity if one of the first confidence level or the second confidence level is less than a threshold confidence level.

9. The method of claim 6, wherein the capacity prediction model includes one or more machine learning models trained to output the estimated capacity of nodes based on training data including historical utilization of compute cores on the plurality of server nodes over a previous period of time, and wherein the capacity prediction model is further trained over time based on changes in utilization of the compute cores on the plurality of server nodes over time.

10. The method of claim 1, wherein the indication of the surplus capacity includes a metric of fragmentation associated with fragmentation of server cores that make up the surplus capacity for the identified period of time.

11. The method of claim 10, wherein determining the quantity of deferrable VMs to be eligible for deployment includes determining a first quantity associated with a first type of deferrable VM and a second quantity associated with a second type of deferrable VM, the first quantity and second quantity being based in part on the metric of fragmentation included within the indication of the surplus capacity.

12. The method of claim 1, further comprising maintaining a record of deployment requests for the plurality of deferrable VMs, wherein the record of deployment requests includes a record of deferrable VMs that have not been fulfilled and a record of deferrable VMs that are currently running on the plurality of server nodes.

13. The method of claim 12, wherein generating the allocation instructions further includes generating eviction instructions for one or more deferrable VMs that are currently running on the plurality of server nodes based on expiration of an indicated lifetime for the one or more deferrable VMs.

14. A method, comprising:
receiving predicted capacity information for a plurality of server nodes, the predicted capacity information including an indication of a surplus capacity for an identified period of time on the plurality of server nodes;
receiving a deployment request for a deferrable virtual machine (VM), the deployment request including an associated duration of time for the deferrable VM to run uninterrupted on a computing resource; and
generating allocation instructions to provide to an allocation engine configured to allocate computing resources on the plurality of server nodes, the allocation instructions including instructions associated with deploying the deferrable VM over the identified period of time.

15. The method of claim 14, wherein the allocation instructions are generated based on a set of rules from a scheduling policy, the set of rules including one or more rules associated with managing risk of allocation failures on the plurality of server nodes with respect to allocating computing resources for non-deferrable VMs.

16. The method of claim 14, wherein the predicted capacity information is determined based on a capacity prediction model trained to determine an estimated capacity of nodes cores that are available for hosting virtual machines thereon over the identified period of time.

17. The method of claim 16, wherein the capacity prediction model includes a combined prediction model trained to combine a first prediction of capacity based on a daily prediction model and a second prediction of capacity based on a weekly prediction model determine the estimated capacity of cores that are available for hosting virtual machines thereon over the identified period of time.

18. A system, comprising:
at least one processor;
memory in electronic communication with the at least one processor; and
instructions stored in the memory, the instructions being executable by the at least one processor to:
receive predicted capacity information for a plurality of server nodes, the predicted capacity information including an indication of a surplus capacity for an identified period of time on the plurality of server nodes;
receive deployment requests for a plurality of deferrable virtual machines (VMs), the deployment requests including, for each deferrable VM, an associated duration of time for the deferrable VM to run uninterrupted on a computing resource;
determine a quantity of deferrable VMs from the plurality of deferrable VMs to be eligible for deployment on the plurality of server nodes over the identified period of time based on the indication of the surplus capacity for the identified period of time; and
generate allocation instructions to provide to an allocation engine configured to allocate computing resources on the plurality of server nodes, the allocation instructions including instructions associated with deploying deferrable VMs over the identified period of time.

19. The system of claim 18, wherein the quantity of deferrable VMs eligible for deployment is based on a set of rules from a scheduling policy, wherein the set of rules include one or more rules associated with managing risk of allocation failures on the plurality of server nodes with respect to allocating computing resources for non-deferrable VMs.

20. The system of claim 19, wherein the set of rules includes one or more rules for prioritizing early allocation of the deferrable VMs within the identified period of time, and wherein generating the allocation instructions includes scheduling allocation of computing resources for as many deferrable VMs as possible while maintaining less than a threshold measure of risk associated with failure of incoming VM requests.

* * * * *